(12) United States Patent
Lowe et al.

(10) Patent No.: US 7,774,604 B2
(45) Date of Patent: Aug. 10, 2010

(54) VERIFYING CAPTURED OBJECTS BEFORE PRESENTATION

(75) Inventors: Rick Lowe, Atherton, CA (US); Shaun Coleman, Saratoga, CA (US); Erik de la Iglesia, Mountain View, CA (US); Samuel King, Los Gatos, CA (US); Ashish Khasgiwala, Cupertino, CA (US)

(73) Assignee: McAfee, Inc., Santa Clara, CA (US)

( * ) Notice: Subject to any disclaimer, the term of this patent is extended or adjusted under 35 U.S.C. 154(b) by 1087 days.

(21) Appl. No.: 10/995,454

(22) Filed: Nov. 22, 2004

(65) Prior Publication Data

US 2005/0177725 A1      Aug. 11, 2005

Related U.S. Application Data

(60) Provisional application No. 60/528,644, filed on Dec. 10, 2003.

(51) Int. Cl.
*H04L 9/32* (2006.01)
*G06F 12/14* (2006.01)
*G08B 23/00* (2006.01)

(52) U.S. Cl. .................................. 713/176; 726/23
(58) Field of Classification Search ................. 713/176; 726/23
See application file for complete search history.

(56) References Cited

U.S. PATENT DOCUMENTS

| | | |
|---|---|---|
| 4,286,255 A | 8/1981 | Siy |
| 4,710,957 A | 12/1987 | Bocci et al. |
| 5,465,299 A | 11/1995 | Matsumoto et al. |
| 5,557,747 A | 9/1996 | Rogers et al. |
| 5,768,578 A | 6/1998 | Kirk et al. |
| 5,781,629 A | 7/1998 | Haber et al. |
| 5,794,052 A | 8/1998 | Harding |
| 5,943,670 A | 8/1999 | Prager |
| 5,995,111 A | 11/1999 | Morioka et al. |
| 6,078,953 A | 6/2000 | Vaid et al. |
| 6,094,531 A | 7/2000 | Allison et al. |
| 6,108,697 A | 8/2000 | Raymond et al. |
| 6,192,472 B1 * | 2/2001 | Garay et al. ................. 713/165 |
| 6,243,091 B1 | 6/2001 | Berstis |

(Continued)

OTHER PUBLICATIONS

Chapter 1. Introduction, "Computer Program product for analyzing network traffic," Ethereal. Computer program product for analyzing network traffic, pp. 17-26, http://web.archive.org/web/20030315045117/www.ethereal.com/distribution/docs/user-guide, printed Mar. 12, 2009.

(Continued)

*Primary Examiner*—Kambiz Zand
*Assistant Examiner*—Michael Guirguis
(74) *Attorney, Agent, or Firm*—Patent Capital Group (57) ABSTRACT

Objects can be extracted from data flows captured by a capture device. Each captured object can then be classified according to content. Meta-data about captured objects can be stored in a tag. In one embodiment, the present invention includes receiving a request to present a previously captured object to a user, accessing a tag associated with the requested object, the tag containing metadata related to the object, the metadata including an object signature, and verifying that the object has not been altered since capture using the object signature before presenting the object to the user.

26 Claims, 6 Drawing Sheets

U.S. PATENT DOCUMENTS

| | | |
|---|---|---|
| 6,292,810 B1 | 9/2001 | Richards |
| 6,356,885 B2 | 3/2002 | Ross et al. |
| 6,408,294 B1 | 6/2002 | Getchius et al. |
| 6,493,761 B1 | 12/2002 | Baker et al. |
| 6,499,105 B1 | 12/2002 | Yoshiura et al. |
| 6,515,681 B1 | 2/2003 | Knight |
| 6,523,026 B1 | 2/2003 | Gillis |
| 6,539,024 B1 | 3/2003 | Janoska et al. |
| 6,571,275 B1 | 5/2003 | Dong et al. |
| 6,598,033 B2 | 7/2003 | Ross et al. |
| 6,662,176 B2 | 12/2003 | Brunet et al. |
| 6,691,209 B1 | 2/2004 | O'Connell |
| 6,771,595 B1 | 8/2004 | Gilbert et al. |
| 6,772,214 B1 | 8/2004 | McClain et al. |
| 6,785,815 B1 | 8/2004 | Serret-Avila et al. |
| 6,820,082 B1 | 11/2004 | Cook et al. |
| 6,857,011 B2 | 2/2005 | Reinke |
| 6,937,257 B1 | 8/2005 | Dunlavey |
| 6,950,864 B1 | 9/2005 | Tsuchiya |
| 6,978,297 B1 | 12/2005 | Piersol |
| 7,020,654 B1 | 3/2006 | Najmi |
| 7,020,661 B1 | 3/2006 | Cruanes et al. |
| 7,062,572 B1 | 6/2006 | Hampton |
| 7,072,967 B1 | 7/2006 | Saulpaugh et al. |
| 7,082,443 B1 | 7/2006 | Ashby |
| 7,093,288 B1 | 8/2006 | Hydrie et al. |
| 7,158,983 B2 | 1/2007 | Willse et al. |
| 7,185,073 B1 | 2/2007 | Gai et al. |
| 7,185,192 B1 | 2/2007 | Kahn |
| 7,219,131 B2 | 5/2007 | Banister et al. |
| 7,219,134 B2 | 5/2007 | Takeshima et al. |
| 7,243,120 B2 | 7/2007 | Massey |
| 7,246,236 B2 | 7/2007 | Stirbu |
| 7,254,562 B2 | 8/2007 | Hsu et al. |
| 7,266,845 B2 | 9/2007 | Hypponen |
| 7,277,957 B2 | 10/2007 | Rowley et al. |
| 7,290,048 B1 | 10/2007 | Barnett et al. |
| 7,296,070 B2 | 11/2007 | Sweeney et al. |
| 7,296,088 B1 | 11/2007 | Padmanabhan et al. |
| 7,299,277 B1 | 11/2007 | Moran et al. |
| 7,373,500 B2 | 5/2008 | Ramelson et al. |
| 7,424,744 B1 | 9/2008 | Wu et al. |
| 7,426,181 B1 | 9/2008 | Feroz et al. |
| 7,434,058 B2 | 10/2008 | Ahuja et al. |
| 7,477,780 B2 | 1/2009 | Boncyk et al. |
| 7,483,916 B2 | 1/2009 | Lowe et al. |
| 7,493,659 B1 | 2/2009 | Wu et al. |
| 7,506,055 B2 | 3/2009 | McClain et al. |
| 7,509,677 B2 | 3/2009 | Saurabh et al. |
| 7,516,492 B1 | 4/2009 | Nisbet et al. |
| 7,551,629 B2 | 6/2009 | Chen et al. |
| 7,596,571 B2 | 9/2009 | Sifry |
| 7,664,083 B1 | 2/2010 | Cermak et al. |
| 2001/0037324 A1 | 11/2001 | Agrawal et al. |
| 2002/0032677 A1 | 3/2002 | Morgenthaler et al. |
| 2002/0052896 A1 | 5/2002 | Streit et al. |
| 2002/0078355 A1 | 6/2002 | Samar |
| 2002/0091579 A1 | 7/2002 | Yehia et al. |
| 2002/0103876 A1 | 8/2002 | Chatani et al. |
| 2002/0107843 A1 | 8/2002 | Biebesheimer et al. |
| 2002/0116124 A1 | 8/2002 | Garin et al. |
| 2002/0126673 A1 | 9/2002 | Dagli et al. |
| 2002/0129140 A1 | 9/2002 | Peled et al. |
| 2002/0159447 A1 | 10/2002 | Carey et al. |
| 2003/0009718 A1 | 1/2003 | Wolfgang et al. |
| 2003/0028493 A1 | 2/2003 | Tajima et al. |
| 2003/0028774 A1 | 2/2003 | Meka |
| 2003/0046369 A1 | 3/2003 | Sim et al. |
| 2003/0053420 A1 | 3/2003 | Duckett et al. |
| 2003/0065571 A1 | 4/2003 | Dutta |
| 2003/0084300 A1 | 5/2003 | Koike |
| 2003/0084318 A1 | 5/2003 | Schertz |
| 2003/0084326 A1 | 5/2003 | Tarquini |
| 2003/0093678 A1 | 5/2003 | Bowe et al. |
| 2003/0099243 A1 | 5/2003 | Oh et al. |
| 2003/0105739 A1 | 6/2003 | Essafi et al. |
| 2003/0131116 A1 | 7/2003 | Jain et al. |
| 2003/0135612 A1 | 7/2003 | Huntington |
| 2003/0185220 A1 | 10/2003 | Valenci |
| 2003/0196081 A1 | 10/2003 | Savarda et al. |
| 2003/0204741 A1 | 10/2003 | Schoen et al. |
| 2003/0221101 A1 | 11/2003 | Micali |
| 2003/0225796 A1 | 12/2003 | Matsubara |
| 2003/0225841 A1 | 12/2003 | Song et al. |
| 2003/0231632 A1 | 12/2003 | Haeberlen |
| 2004/0059736 A1 | 3/2004 | Willse et al. |
| 2004/0071164 A1 | 4/2004 | Baum |
| 2004/0111678 A1 | 6/2004 | Hara |
| 2004/0114518 A1 | 6/2004 | MacFaden et al. |
| 2004/0117414 A1 | 6/2004 | Braun et al. |
| 2004/0120325 A1 | 6/2004 | Ayres |
| 2004/0122863 A1* | 6/2004 | Sidman .................. 707/104.1 |
| 2004/0181513 A1 | 9/2004 | Henderson et al. |
| 2004/0194141 A1 | 9/2004 | Sanders |
| 2004/0196970 A1 | 10/2004 | Cole |
| 2004/0230572 A1 | 11/2004 | Omoigui |
| 2004/0267753 A1 | 12/2004 | Hoche |
| 2005/0004911 A1 | 1/2005 | Goldberg et al. |
| 2005/0021715 A1 | 1/2005 | Dugatkin et al. |
| 2005/0021743 A1 | 1/2005 | Fleig et al. |
| 2005/0022114 A1 | 1/2005 | Shanahan et al. |
| 2005/0027881 A1 | 2/2005 | Figueira et al. |
| 2005/0033747 A1 | 2/2005 | Wittkotter |
| 2005/0033803 A1 | 2/2005 | Vleet et al. |
| 2005/0050205 A1 | 3/2005 | Gordy et al. |
| 2005/0055327 A1 | 3/2005 | Agrawal et al. |
| 2005/0055399 A1 | 3/2005 | Savchuk |
| 2005/0091443 A1 | 4/2005 | Hershkovich et al. |
| 2005/0091532 A1 | 4/2005 | Moghe |
| 2005/0108244 A1 | 5/2005 | Riise et al. |
| 2005/0114452 A1 | 5/2005 | Prakash |
| 2005/0120006 A1 | 6/2005 | Nye |
| 2005/0127171 A1 | 6/2005 | Ahuja et al. |
| 2005/0131876 A1 | 6/2005 | Ahuja et al. |
| 2005/0132034 A1 | 6/2005 | de la Iglesia et al. |
| 2005/0132046 A1 | 6/2005 | de la Iglesia et al. |
| 2005/0132079 A1 | 6/2005 | de la Iglesia et al. |
| 2005/0132197 A1 | 6/2005 | Medlar |
| 2005/0132198 A1 | 6/2005 | Ahuja et al. |
| 2005/0132297 A1 | 6/2005 | Milic-Frayling et al. |
| 2005/0138242 A1 | 6/2005 | Pope et al. |
| 2005/0138279 A1 | 6/2005 | Somasundaram |
| 2005/0149504 A1 | 7/2005 | Ratnaparkhi |
| 2005/0166066 A1 | 7/2005 | Ahuja et al. |
| 2005/0180341 A1 | 8/2005 | Nelson et al. |
| 2005/0203940 A1 | 9/2005 | Farrar et al. |
| 2005/0204129 A1 | 9/2005 | Sudia et al. |
| 2005/0228864 A1 | 10/2005 | Robertson |
| 2005/0235153 A1 | 10/2005 | Ikeda |
| 2005/0289181 A1 | 12/2005 | Deninger et al. |
| 2006/0005247 A1 | 1/2006 | Zhang et al. |
| 2006/0021045 A1 | 1/2006 | Cook |
| 2006/0021050 A1 | 1/2006 | Cook et al. |
| 2006/0037072 A1 | 2/2006 | Rao et al. |
| 2006/0041560 A1 | 2/2006 | Forman et al. |
| 2006/0041570 A1 | 2/2006 | Lowe et al. |
| 2006/0041760 A1* | 2/2006 | Huang ........................ 713/189 |
| 2006/0047675 A1 | 3/2006 | Lowe et al. |
| 2006/0083180 A1 | 4/2006 | Baba et al. |
| 2006/0167896 A1 | 7/2006 | Kapur et al. |
| 2006/0184532 A1 | 8/2006 | Hamada et al. |
| 2006/0242126 A1 | 10/2006 | Fitzhugh |
| 2006/0242313 A1 | 10/2006 | Le et al. |
| 2006/0251109 A1 | 11/2006 | Muller et al. |

| | | |
|---|---|---|
| 2006/0288216 A1 | 12/2006 | Buhler et al. |
| 2007/0006293 A1 | 1/2007 | Balakrishnan et al. |
| 2007/0036156 A1 | 2/2007 | Liu et al. |
| 2007/0050334 A1 | 3/2007 | Deninger et al. |
| 2007/0050381 A1 | 3/2007 | Hu et al. |
| 2007/0094394 A1 | 4/2007 | Singh et al. |
| 2007/0110089 A1* | 5/2007 | Essafi et al. ............... 370/420 |
| 2007/0116366 A1 | 5/2007 | Deninger et al. |
| 2007/0136599 A1 | 6/2007 | Suga |
| 2007/0162609 A1 | 7/2007 | Pope et al. |
| 2007/0226504 A1 | 9/2007 | de la Iglesia et al. |
| 2007/0226510 A1 | 9/2007 | de la Iglesia et al. |
| 2007/0248029 A1 | 10/2007 | Merkey et al. |
| 2007/0271254 A1 | 11/2007 | de la Iglesia et al. |
| 2007/0271371 A1 | 11/2007 | Ahuja et al. |
| 2007/0271372 A1 | 11/2007 | Deninger et al. |
| 2007/0280123 A1 | 12/2007 | Atkins et al. |
| 2008/0028467 A1 | 1/2008 | Kommareddy et al. |

OTHER PUBLICATIONS

U.S. Appl. No. 12/190,536, filed Aug. 12, 2008, entitled "Configuration Management for a Capture/Registration System," Inventor(s) Jitendra B. Gaitonde et al.

U.S. Appl. No. 12/352,720, filed Jan. 13, 2009, entitled "System and Method for Concept Building," Inventor(s) Ratinder Paul Singh Ahuja et al.

U.S. Appl. No. 12/354,688, filed Jan. 15, 2009, entitled "System and Method for Intelligent Term Grouping," Inventor(s) Ratinder Paul Ahuja et al.

U.S. Appl. No. 12/358,399, filed Jan. 23, 2009, entitled "System and Method for Intelligent State Management," Inventor(s) William Deninger et al.

U.S. Appl. No. 12/410,875, filed Mar. 25, 2009, entitled "System and Method for Data Mining and Security Policy Management," Inventor(s) Ratinder Paul Singh Ahuja et al.

U.S. Appl. No. 12/410,905, filed Mar. 25, 2009, entitled "System and Method for Managing Data and Policies," Inventor(s) Ratinder Paul Singh Ahuja et al.

Preneel, Bart, "Cryptographic Hash Functions", Proceedings of the $3^{rd}$ Symposium on State and Progress of Research in Cryptography, 1993, pp. 161-171.

U.S. Appl. No. 12/360,537, filed Jan. 27, 2009, entitled "Database for a Capture System," Inventor(s) Rick Lowe et al.

U.S. Appl. No. 11/254,436, filed Oct. 19, 2005, entitled "Attributes of Captured Objects in a Capture System," Inventor(s) William Deninger et al.

U.S. Appl. No. 12/472,150, filed May 26, 2009, entitled "Identifying Image Type in a Capture System," Inventor(s) William Deninger et al.

U.S. Appl. No. 11/900,964, filed Sep. 14, 2007, entitled "System and Method for Indexing a Capture System," Inventor(s) Ashok Doddapaneni et al.

U.S. Appl. No. 12/171,232, filed Jul. 10, 2008, entitled "System and Method for Data Mining and Security Policy Management," Inventor(s) Weimin Liu et al.

Microsoft Outlook, Out look, copyright 1995-2000, 2 pages.

U.S. Appl. No. 12/690,153, filed Jan. 20, 2010, entitled "Query Generation for a Capture System," Inventor(s) Erik de la Iglesia, et al.

* cited by examiner

VERIFYING CAPTURED OBJECTS BEFORE PRESENTATION

PRIORITY AND RELATED APPLICATIONS

This patent application is related to, incorporates by reference, and claims the priority benefit of U.S. Provisional Application 60/528,644, entitled "VERIFYING CAPTURED OBJECTS BEFORE PRESENTATION", filed Dec. 10, 2003.

FIELD OF THE INVENTION

The present invention relates to computer networks, and in particular, to secure storing of captured objects.

BACKGROUND

Computer networks and systems have become indispensable tools for modern business. Modern enterprises use such networks for communications and for storage. The information and data stored on the network of a business enterprise is often a highly valuable asset. Modem enterprises use numerous tools to keep outsiders, intruders, and unauthorized personnel from accessing valuable information stored on the network. These tools include firewalls, intrusion detection systems, and packet sniffer devices. However, once an intruder has gained access to sensitive content, there is no network device that can prevent the electronic transmission of the content from the network to outside the network. Similarly, there is no network device that can analyse the data leaving the network to monitor for policy violations, and make it possible to track down information leeks. What is needed is a comprehensive system to capture, store, and analyse all data communicated using the enterprises network.

SUMMARY OF THE INVENTION

Objects can be extracted from data flows captured by a capture device. Each captured object can then be classified according to content. Meta-data about captured objects can be stored in a tag. In one embodiment, the present invention includes receiving a request to present a previously captured object to a user, accessing a tag associated with the requested object, the tag containing metadata related to the object, the metadata including an object signature, and verifying that the object has not been altered since capture using the object signature before presenting the object to the user.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

Although the present system will be discussed with reference to various illustrated examples, these examples should not be read to limit the broader spirit and scope of the present invention. Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated.

It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Networks

Figure 1:
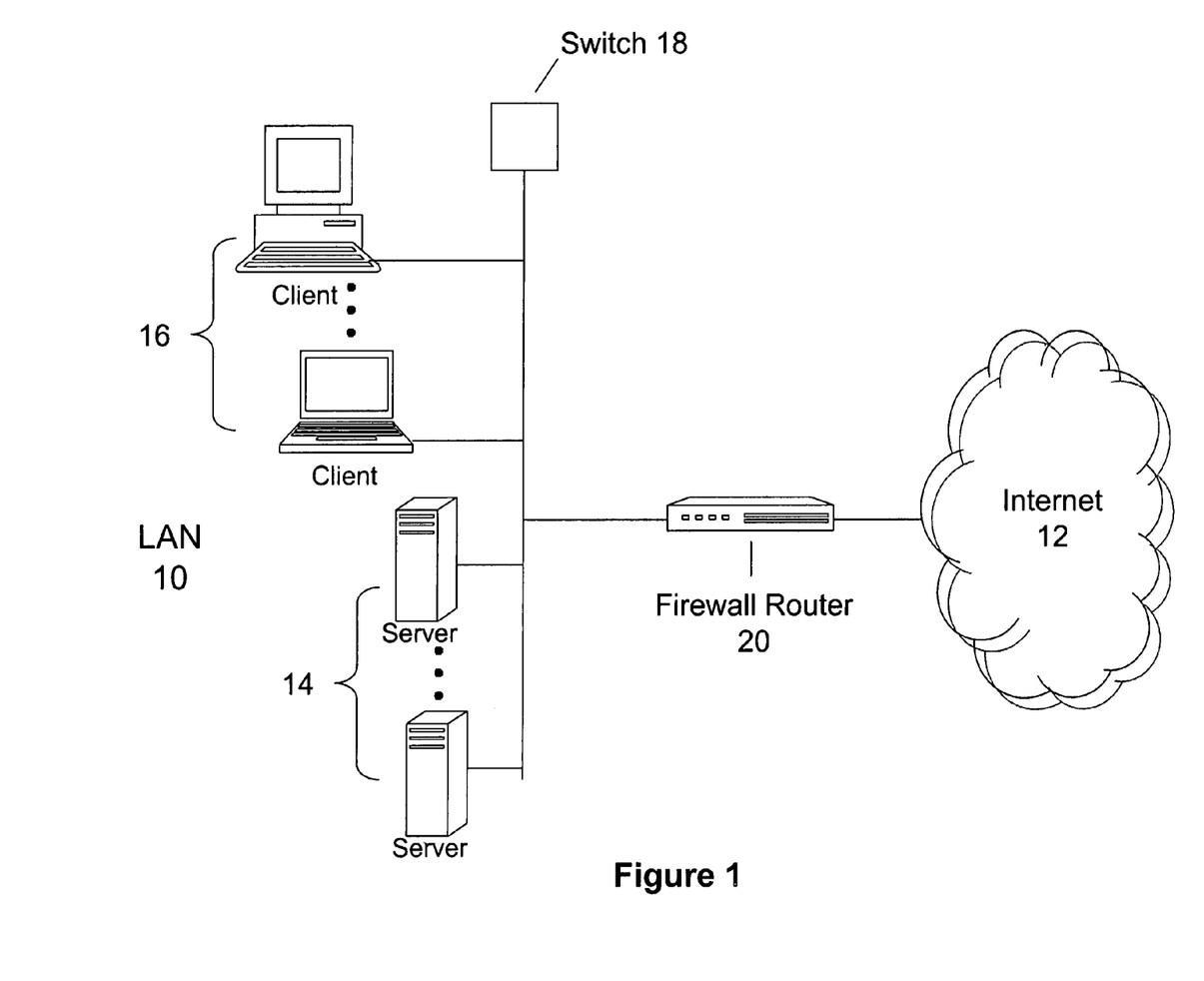
FIG. 1 is a block diagram illustrating a computer network connected to the Internet.

FIG. 1 illustrates a simple prior art configuration of a local area network (LAN) 10 connected to the Internet 12. Connected to the LAN 102 are various components, such as servers 14, clients 16, and switch 18. There are numerous other known networking components and computing devices that can be connected to the LAN 10. The LAN 10 can be implemented using various wireline or wireless technologies, such as Ethernet and 802.11b. The LAN 10 may be much more complex than the simplified diagram in FIG. 1, and may be connected to other LANs as well.

In FIG. 1, the LAN 10 is connected to the Internet 12 via a router 20. This router 20 can be used to implement a firewall, which are widely used to give users of the LAN 10 secure access to the Internet 12 as well as to separate a company's public Web server (can be one of the servers 14) from its internal network, i.e., LAN 10. In one embodiment, any data leaving the LAN 10 towards the Internet 12 must pass through the router 12. However, there the router 20 merely forwards packets to the Internet 12. The router 20 cannot capture, analyze, and searchably store the content contained in the forwarded packets.

Figure 2:
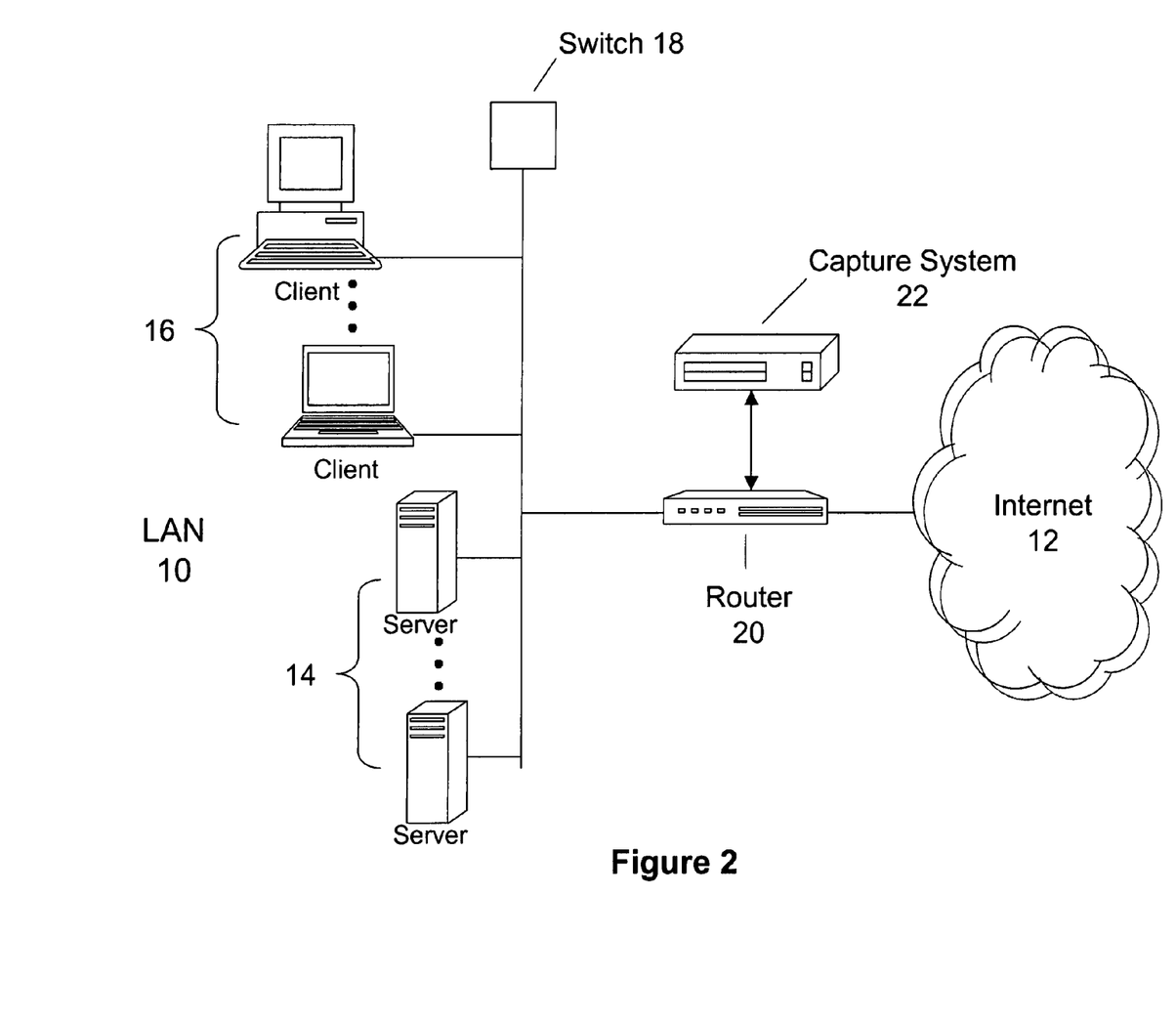
FIG. 2 is a block diagram illustrating one configuration of a capture system according to one embodiment of the present invention.

One embodiment of the present invention is now illustrated with reference to FIG. 2. FIG. 2 shows the same simplified configuration of connecting the LAN 10 to the Internet 12 via the router 20. However, in FIG. 2, the router 20 is also connected to a capture system 22. In one embodiment, the router 12 splits the outgoing data stream, and forwards one copy to the Internet 12 and the other copy to the capture system 22.

There are various other possible configurations. For example, the router 12 can also forward a copy of all incoming data to the capture system 22 as well. Furthermore, the capture system 22 can be configured sequentially in front of, or behind the router 20, however this makes the capture system 22 a critical component in connecting to the Internet 12. In systems where a router 12 is not used at all, the capture system can be interposed directly between the LAN 10 and the Internet 12. In one embodiment, the capture system 22 has a user interface accessible from a LAN-attached device, such as a client 16.

In one embodiment, the capture system 22 intercepts all data leaving the network. In other embodiments, the capture system can also intercept all data being communicated inside the network 10. In one embodiment, the capture system 22 reconstructs the documents leaving the network 10, and stores them in a searchable fashion. The capture system 22 can then be used to search and sort through all documents that have left the network 10. There are many reasons such documents may be of interest, including network security reasons, intellectual property concerns, corporate governance regulations, and other corporate policy concerns.

Capture System

Figure 3:
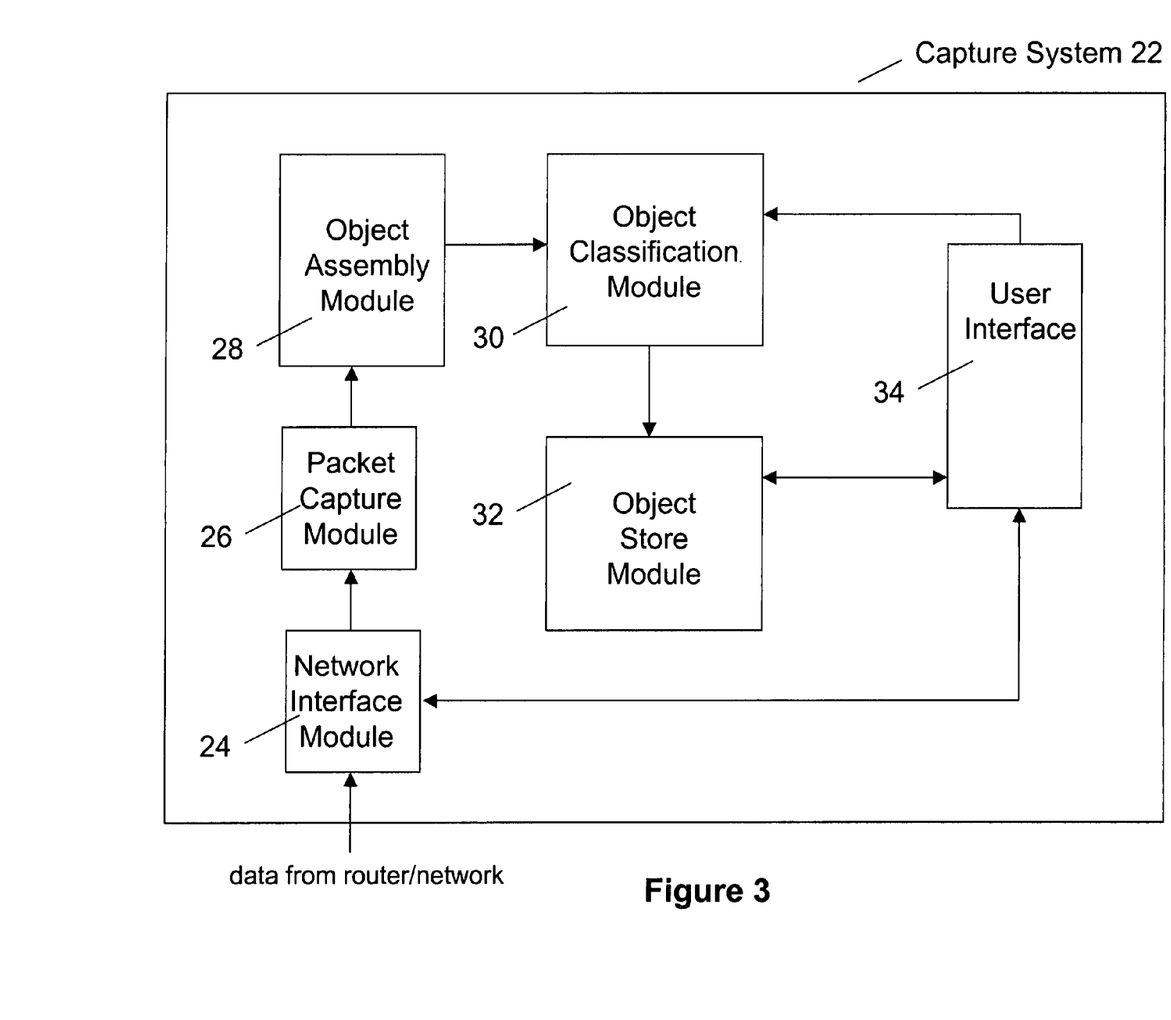
FIG. 3 is a block diagram illustrating the capture system according to one embodiment of the present invention.

One embodiment of the present invention is now described with reference to FIG. 3. FIG. 3 shows one embodiment of the capture system 22 in more detail. The capture system 22 includes a network interface module 24 to receive the data from the network 10 or the router 20. In one embodiment, the network interface module 24 is implemented using one or more network interface cards (NIC), e.g., Ethernet cards. In one embodiment, the router 20 delivers all data leaving the network to the network interface module 24.

The captured raw data is then passed to a packet capture module 26. In one embodiment, the packet capture module 26 extracts data packets from the data stream received from the network interface module 24. In one embodiment, the packet capture module 26 reconstructs Ethernet packets from multiple sources to multiple destinations for the raw data stream.

In one embodiment, the packets are then provided the object assembly module 28. The object assembly module 28 reconstructs the objects being transmitted by the packets. For example, when a document is transmitted, e.g. as an email attachment, it is broken down into packets according to various data transfer protocols such as Transmission Control Protocol/Internet Protocol (TCP/IP) and Ethernet. The object assembly module 28 can reconstruct the document from the captured packets.

Figure 4:
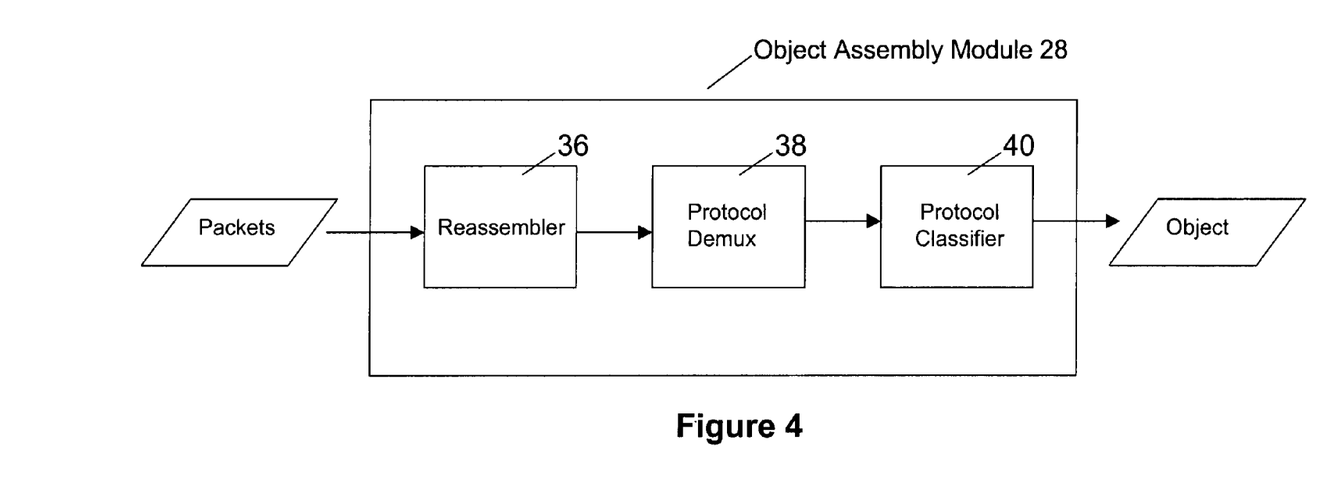
FIG. 4 is a block diagram illustrating an object assembly module according to one embodiment of the present invention.

One embodiment of the object assembly module 28 is now described in more detail with reference to FIG. 4. When packets first enter the object assembly module, they are first provided to a reassembler 36. In one embodiment, the reassembler 36 groups—assembles—the packets into unique flows. For example, a flow can be defined as packets with identical Source IP and Destination IP addresses as well as identical TCP Source and Destination Ports. That is, the reassembler 36 can organize a packet stream by sender and recipient.

In one embodiment, the reassembler 36 begins a new flow upon the observation of a starting packet defined by the data transfer protocol. For a TCP/IP embodiment, the starting packet is generally referred to as the "SYN" packet. The flow can terminate upon observation of a finishing packet, e.g., a "Reset" or "FIN" packet in TCP/IP. If now finishing packet is observed by the reassembler 36 within some time constraint, it can terminate the flow via a timeout mechanism. In an embodiment using the TPC protocol, a TCP flow contains an ordered sequence of packets that can be assembled into a contiguous data stream by the ressembler 36. Thus, in one embodiment, a flow is an ordered data stream of a single communication between a source and a destination.

The flown assembled by the reassembler 36 can then be provided to a protocol demultiplexer (demux) 38. In one embodiment, the protocol demux 38 sorts assembled flows using the TCP Ports. This can include performing a speculative classification of the flow contents based on the association of well-known port numbers with specified protocols. For example, Web Hyper Text Transfer Protocol (HTTP) packets—i.e., Web traffic—are typically associated with port 80, File Transfer Protocol (FTP) packets with port 20, Kerberos authentication packets with port 88, and so on. Thus in one embodiment, the protocol demux 38 separates all the different protocols in one flow.

In one embodiment, a protocol classifier 40 also sorts the flows in addition to the protocol demux 38. In one embodiment, the protocol classifier 40—operating either in parallel or in sequence with the protocol demux 38—applies signature filters to the flows to attempt to identify the protocol based solely on the transported data. Furthermore, the protocol demux 38 can make a classification decision based on port number which is subsequently overridden by protocol classifier 40. For example, if an individual or program attempted to masquerade an illicit communication (such as file sharing) using an apparently benign port such as port 80 (commonly used for HTTP Web browsing), the protocol classifier 40 would use protocol signatures, i.e., the characteristic data sequences of defined protocols, to verify the speculative classification performed by protocol demux 38.

In one embodiment, the object assembly module 28 outputs each flow organized by protocol, which represent the underlying objects. Referring again to FIG. 3, these objects can then be handed over to the object classification module 30 (sometimes also referred to as the "content classifier") for classification based on content. A classified flow may still contain multiple content objects depending on the protocol used. For example, protocols such as HTTP (Internet Web Surfing) may contain over 100 objects of any number of content types in a single flow. To deconstruct the flow, each object contained in the flow is individually extracted, and decoded, if necessary, by the object classification module 30.

The object classification module 30 uses the inherent properties and signatures of various documents to determine the content type of each object. For example, a Word document has a signature that is distinct from a PowerPoint document, or an Email document. The object classification module 30 can extract out each individual object and sort them out by such content types. Such classification renders the present invention immune from cases where a malicious user has altered a file extension or other property in an attempt to avoid detection of illicit activity.

In one embodiment, the object classification module 30 determines whether each object should be stored or discarded. In one embodiment, this determination is based on a various capture rules. For example, a capture rule can indicate that Web Traffic should be discarded. Another capture rule can indicate that all PowerPoint documents should be stored, except for ones originating from the CEO's IP address. Such capture rules can be implemented as regular expressions, or by other similar means. Several embodiments of the object classification module 30 are described in more detail further below.

In one embodiment, the capture rules are authored by users of the capture system 22. The capture system 22 is made accessible to any network-connected machine through the network interface module 24 and user interface 34. In one embodiment, the user interface 34 is a graphical user interface providing the user with friendly access to the various features of the capture system 22. For example, the user interface 34 can provide a capture rule authoring tool that allows users to write and implement any capture rule desired, which are then applied by the object classification module 30 when determining whether each object should be stored. The user interface 34 can also provide pre-configured capture rules that the user can select from along with an explanation of the operation of such standard included capture rules. In one embodiment, the default capture rule implemented by the object classification module 30 captures all objects leaving the network 10.

Figure 5:
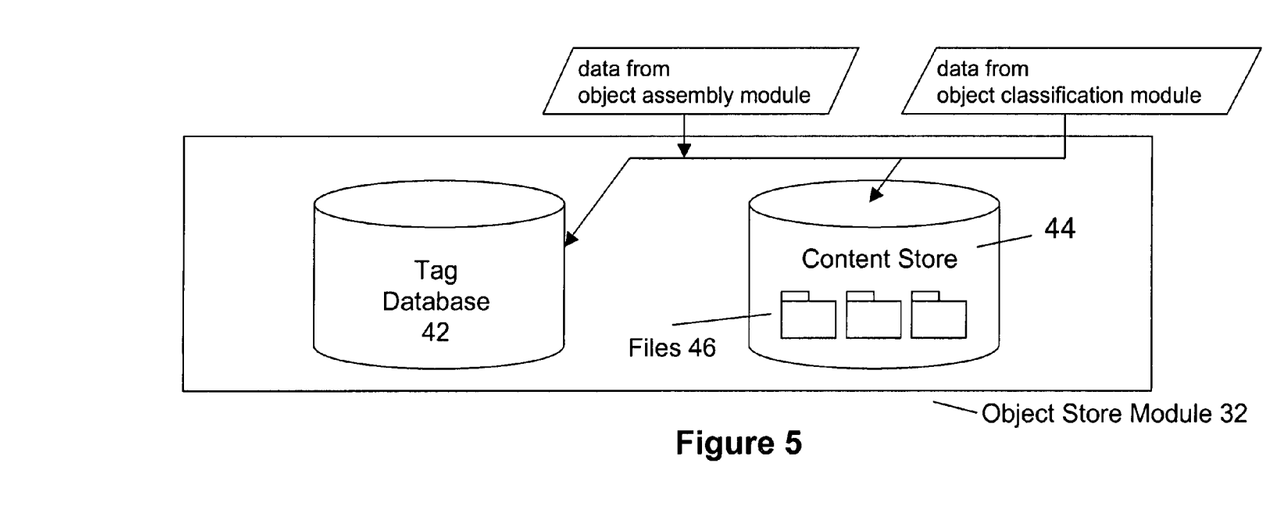
FIG. 5 is a block diagram illustrating an object store module according to one embodiment of the present invention.

If the capture of an object is mandated by the capture rules, the object classification module 30 can also determine where in the object store module 32 the captured object should be stored. With reference to FIG. 5, in one embodiment, the objects are stored in a content store 44 memory block. Within the content store 44 are files 46 divided up by content type. Thus, for example, if the object classification module determines that an object is a Word document that should be stored, it can store it in the file 46 reserved for Word documents. In one embodiment, the object store module 32 is integrally included in the capture system 22. In other embodiments, the object store module can be external—entirely or in part—using, for example, some network storage technique such as network attached storage (NAS) and storage area network (SAN).

Tag Data Structure

In one embodiment, the content store is a canonical storage location, simply a place to deposit the captured objects. The indexing of the objects stored in the content store 44 is accomplished using a tag database 42. In one embodiment, the tag database 42 is a database data structure in which each record is a "tag" that indexes an object in the content store 44 and contains relevant information about the stored object. An example of a tag record in the tag database 42 that indexes an object stored in the content store 44 is set forth in Table 1:

TABLE 1

| Field Name | Definition |
| --- | --- |
| MAC Address | Ethernet controller MAC address unique to each capture system |
| Source IP | Source Ethernet IP Address of object |
| Destination IP | Destination Ethernet IP Address of object |
| Source Port | Source TCP/IP Port number of object |
| Destination Port | Destination TCP/IP Port number of the object |
| Protocol | IP Protocol that carried the object |
| Instance | Canonical count identifying object within a protocol capable of carrying multiple data within a single TCP/IP connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Hash signature of object |
| Tag Signature | Hash signature of all preceding tag fields |

There are various other possible tag fields, and some embodiments can omit numerous tag fields listed in Table 1. In other embodiments, the tag database 42 need not be implemented as a database, and a tag need not be a record. Any data structure capable of indexing an object by storing relational data over the object can be used as a tag data structure. Furthermore, the word "tag" is merely descriptive, other names such as "index" or "relational data store," would be equally descriptive, as would any other designation performing similar functionality.

The mapping of tags to objects can, in one embodiment, be obtained by using unique combinations of tag fields to construct an object's name. For example, one such possible combination is an ordered list of the Source IP, Destination IP, Source Port, Destination Port, Instance and Timestamp. Many other such combinations including both shorter and longer names are possible. In another embodiment, the tag can contain a pointer to the storage location where the indexed object is stored.

The tag fields shown in Table 1 can be expressed more generally, to emphasize the underlying information indicated by the tag fields in various embodiments. Some of these possible generic tag fields are set forth in Table 2:

TABLE 2

| Field Name | Definition |
| --- | --- |
| Device Identity | Identifier of capture device |
| Source Address | Origination Address of object |
| Destination Address | Destination Address of object |
| Source Port | Origination Port of object |
| Destination Port | Destination Port of the object |
| Protocol | Protocol that carried the object |
| Instance | Canonical count identifying object within a protocol capable of carrying multiple data within a single connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Signature of object |
| Tag Signature | Signature of all preceding tag fields |

For many of the above tag fields in Tables 1 and 2, the definition adequately describes the relational data contained by each field. For the content field, the types of content that the object can be labeled as are numerous. Some example choices for content types (as determined, in one embodiment, by the object classification module 30) are JPEG, GIF, BMP, TIFF, PNG (for objects containing images in these various formats); Skintone (for objects containing images exposing human skin); PDF, MSWord, Excel, PowerPoint, MSOffice (for objects in these popular application formats); HTML, WebMail, SMTP, FTP (for objects captured in these transmission formats); Telnet, Rlogin, Chat (for communication conducted using these methods); GZIP, ZIP, TAR (for archives or collections of other objects); Basic_Source, C++_Source, C_Source, Java_Source, FORTRAN_Source, Verilog_Source, VHDL_Source, Assembly_Source, Pascal_Source, Cobol_Source, Ada_Source, Lisp_Source, Perl_Source, XQuery_Source, Hypertext Markup Language, Cascaded Style Sheets, JavaScript, DXF, Spice, Gerber, Mathematica, Matlab, AllegroPCB, ViewLogic, TangoPCAD, BSDL, C_Shell, K_Shell, Bash_Shell, Bourne_Shell, FTP, Telnet, MSExchange, POP3, RFC822, CVS, CMS, SQL, RTSP, MIME, PDF, PS (for source, markup, query, descriptive, and design code authored in these high-level programming languages); C Shell, K Shell, Bash Shell (for shell program scripts); Plaintext (for otherwise unclassified textual objects); Crypto (for objects that have been encrypted or that contain cryptographic elements); Englishtext, Frenchtext, Germantext, Spanishtext, Japanesetext, Chinesetext, Koreantext, Russiantext (any human language text); Binary Unknown, ASCII Unknown, and Unknown (as catchall categories).

The signature contained in the Signature and field can be any digest or hash over the object, or some portion thereof, and the Tag Signature can similarly be any such digest or hash over the other tag fields or a portion thereof. In one embodiment, a well-known hash, such as MD5 or SHA1 can be used. In one embodiment, the Signature is a digital cryptographic signature. In one embodiment, a digital cryptographic signature is a hash signature that is signed with the private key of the capture system 22. Only the capture system 22 knows its own private key, thus, the integrity of the stored object can be verified by comparing a hash of the stored object to the signature decrypted with the public key of the capture system 22, the private and public keys being a public key cryptosystem key pair. Thus, if a stored object is modified from when it was originally captured, the modification will cause the comparison to fail.

Similarly, the signature over the tag stored in the Tag Signature field can also be a digital cryptographic signature. In such an embodiment, the integrity of the tag can also be verified. In one embodiment, verification of the object using the signature, and the tag using the tag signature is performed whenever an object is presented, e.g., displayed to a user. In one embodiment, if the object or the tag is found to have been compromised, an alarm is generated to alert the user that the object displayed may not be identical to the object originally captured.

Object Presentation

Data corruption can occur for various reasons in a capture system like the one described above. For example, objects stored in the content store 44 or tags stored in the tag database 42 can experience inadvertent changes due to electric or mechanic failures of the storage system, such as bit-flip errors. Also, an attacker may maliciously alter an object or a tag for inappropriate purposes. Thus, in one embodiment, when a captured and stored object is presented to users, it is first verified for authenticity.

Presentation of an object may include the displaying, downloading, transferring, returning as a query result, or otherwise accessing of the object. Verifying the authenticity of an object, in one embodiment, means that the object presented is guaranteed to be identical to the object when captured. One embodiment, of object verification is now described with reference to FIG. 7.

Figure 7:
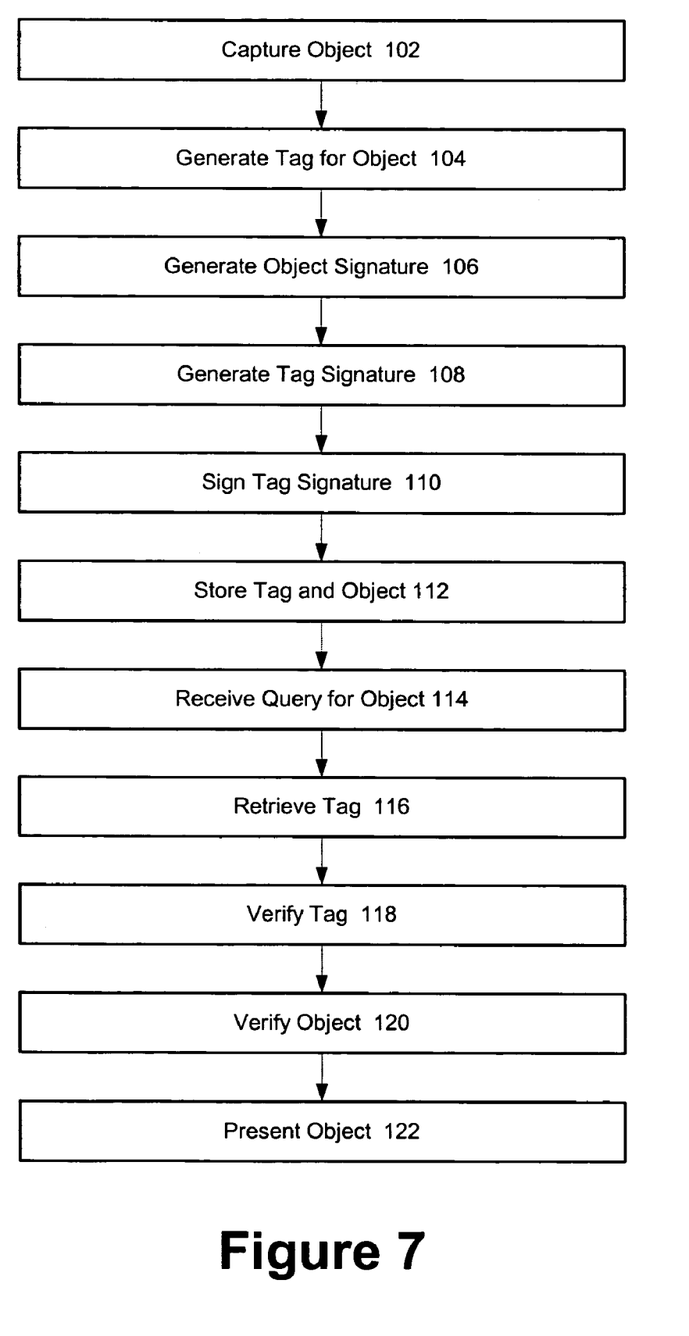
FIG. 7 is a flow diagram illustrating object presentation according to one embodiment of the present invention.

In block 102, an object is captured by the capture system 22 as described above with reference to FIG. 3. In block 104, a tag—such as those of Tables 1 and 2 above—is generated for the object, and the tag fields are populated with the available meta-data about the captured objects as determined by the various modules described with reference to FIG. 3.

In block 106, the object signature is generated, such as the Signature field described with reference to Table 2 above. In one embodiment, the object signature is a hash over the object. In one embodiment, the object signature is not cryptographically signed. In block 108, the tag signature is generated, such as the Tag Signature field described with reference to Table 2 above. In one embodiment, the tag signature encompasses all other tag fields, including the object signature.

In block 110, the tag signature is cryptographically signed. In one embodiment, this is done by signing, i.e., encrypting, the tag signature with the private key of the capture device 22. The private key belongs to a public key cryptosystem, thus making it possible to check whether the tag signature was indeed produces by the capture device 22 in possession of the private key. The signed tag signature becomes, therefore, a digital certificate able to verify the authenticity of the tag and the meta-data, including the object signature, contained therein. In other embodiments, other cryptosystems can be used to encrypt the tag signature in a secure manner.

In block 112, the object and tag signatures are inserted into the tag in the appropriate fields, and the tag and the object are stored. Between block 112 and 114 some time may elapse. During this time an attacker or an error may compromise the object, the tag, or both. The tag and the object may be transferred to a storage outside of the capture device, e.g., the content store and tag database may be downloaded to a backup facility or a file server network. Thus, the entity performing blocks 114 to 122 may or may not be the capture system 22 that originally captured the object in block 102.

In block 114 a query for the captured object is received. This could mean that a user requests to download or display the object, that the object is being provided as part of a larger search, that the object is about to be displayed or transferred, or any other request for the presentation of the captured object. In block 116 the tag associated with the object is retrieved.

In block 118, the tag is verified using the tag signature generated in block 108 and stored in the tag. In one embodiment, verifying the tag includes re-calculating the hash and decrypting the hash of the tag with the public key of the capture device that captured the object. If the newly calculated signature matches the tag signature included in the tag, then the tag has not been altered since original storage in block 112.

In block 120, the object is verified using the object signature generated in block 106 and stored in the tag. In one embodiment, verifying the object also including re-calculating the hash over the retrieved object and comparing the result with the stored object signature generated in block 106. In one embodiment, the object signature is not cryptographically signed. Such precaution may be unnecessary, since the object signature is incorporated into the tag signature (which is a hash over all other tag fields including the object signature), thus encrypting the object signature by proxy. In another embodiment, the object signature is also cryptographically signed, and is decrypted using the public key of the capture system 22. In yet another embodiment, neither the tag nor the object signatures are signed cryptographically.

In one embodiment, if both the tag and object verification is successful, then, in block 122, the object is presented in the manner required by the request in block 114. For example, if a user wishes to access an object via the user interface 34 of the capture device 22 or some other device having access to the captured object, then, in block 122, the object is displayed to the user. Since the object was verified, it is guaranteed to be in the same condition as it was when captured in block 102, within the security limits provided by the hash and signature. Similarly, the meta-data in the tag is also guaranteed to be as originally observed by the capture system 22.

In one embodiment, if either the tag verification in block 118 or the object verification in block 120 fails, an alert is generated (e.g., a message) for the user, to alert the user that the object and/or the meta-data related thereto have in some way been altered. The object can still be presented to the user, however, its authenticity will be put in question by the alert. In addition to the alert, in one embodiment, the system also determines whether the cause of the verification failure is likely inadvertent error, or malicious manipulation.

General Matters

In several embodiments, the capture system 22 has been described above as a stand-alone device. However, the capture system of the present invention can be implemented on any appliance capable of capturing and analyzing data from a network. For example, the capture system 22 described above could be implemented on one or more of the servers 14 or clients 16 shown in FIG. 1. The capture system 22 can interface with the network 10 in any number of ways, including wirelessly.

Figure 6:
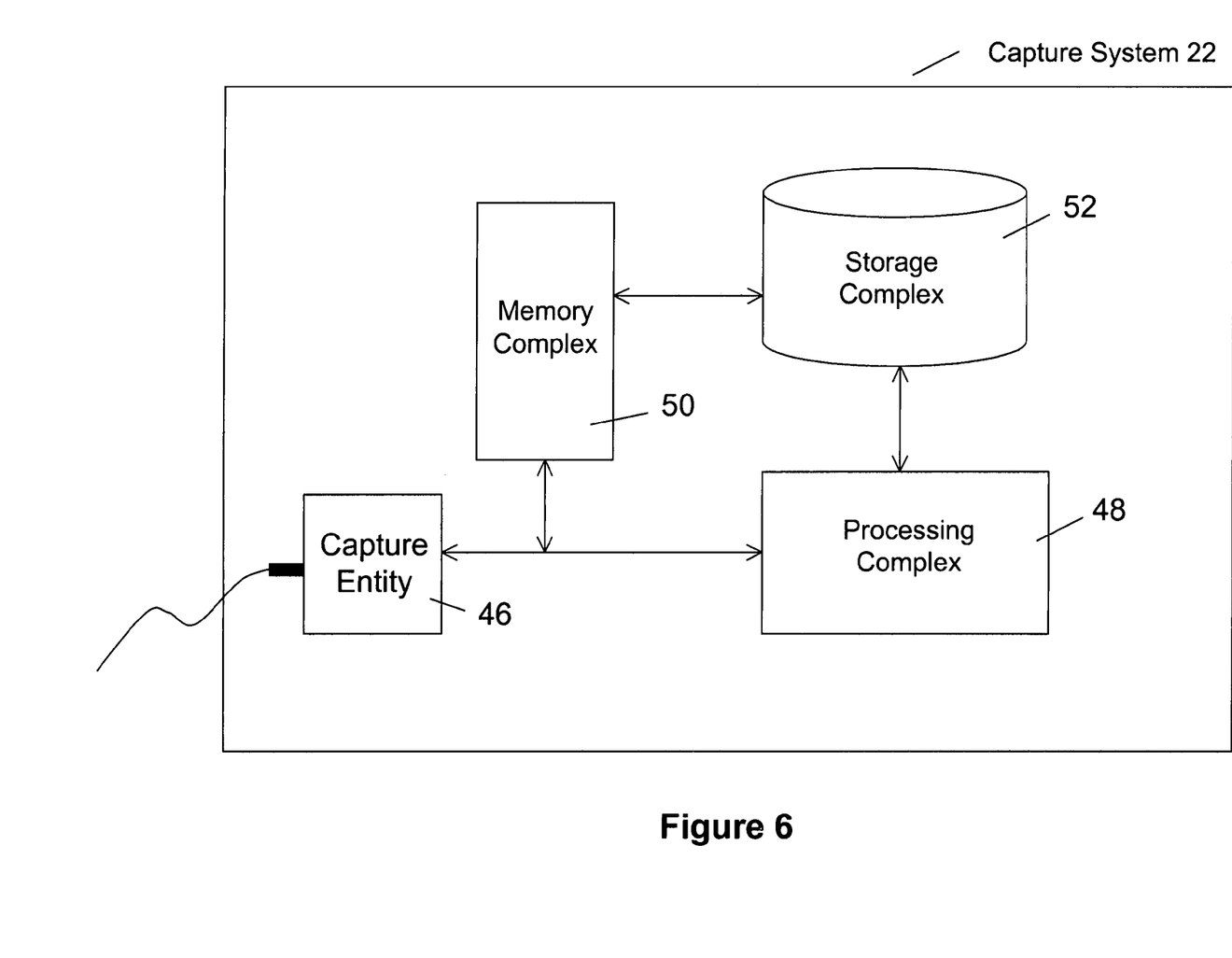
FIG. 6 is a block diagram illustrating an example hardware architecture for a capture system according to one embodiment of the present invention.

In one embodiment, the capture system 22 is an appliance constructed using commonly available computing equipment and storage systems capable of supporting the software requirements. In one embodiment, illustrated by FIG. 6, the hardware consists of a capture entity 46, a processing complex 48 made up of one or more processors, a memory complex 50 made up of one or more memory elements such as RAM and ROM, and storage complex 52, such as a set of one or more hard drives or other digital or analog storage means. In another embodiment, the storage complex 52 is external to the capture system 22, as explained above. In one embodiment, the memory complex stored software consisting of an operating system for the capture system device 22, a capture program, and classification program, a database, a filestore, an analysis engine and a graphical user interface.

Thus, a capture system and an object presentation procedure have been described. In the forgoing description, various specific values were given names, such as "objects" and "tags," and various specific modules, such as the "object store module" and "tag database" have been described. However, these names are merely to describe and illustrate various aspects of the present invention, and in no way limit the scope of the present invention. Furthermore, various modules can be implemented as software or hardware modules, or without dividing their functionalities into modules at all. The present invention is not limited to any modular architecture either in software or in hardware, whether described above or not.

What is claimed is:

1. A method comprising:
receiving a request to present a previously captured object to a user, wherein the captured object was intercepted by a capture system configured to intercept packets from data streams, reconstruct the data streams, and store network transmitted objects from the data streams according to a capture rule that defines which objects are to be captured by the capture system;
accessing a tag associated with the requested object, the tag containing metadata related to the object, the metadata including an object signature;
verifying that the object has not been altered since capture using the object signature in the tag associated with the object, wherein the tag is verified using a hash, which is decrypted with a public key of the capture system; and
presenting the object if the object and the tag are verified, and wherein the capture rule is part of a default rule set for the capture system configured to monitor network traffic and capture the object, and wherein the capture system is configured to store a document captured by the capture system according to the capture rule, which identifies a particular internet protocol (IP) address from which the document was sent, and wherein if the object is not verified, then an alert is generated to indicate that the object being presented to the user has been compromised.

2. The method of claim 1, wherein the tag includes a tag signature.

3. The method of claim 2, wherein the tag signature comprises a cryptographically secure signature.

4. The method of claim 3, wherein the tag signature is signed using a private key of a capture device that captured the object associated with the tag, the private key being part of a public key cryptosystem.

5. The method of claim 2, further comprising verifying that the tag has not been altered since creation prior to presenting the object to the user.

6. The method of claim 5, wherein verifying that the tag has not been altered comprises alerting the user that the tag has been altered in the event that the verification fails.

7. The method of claim 1, wherein verifying that the object has not been altered comprises alerting the user that the object has been altered in the event that the verification fails.

8. The method of claim 1, wherein verifying that the object has not been altered since capture comprises calculating a new object signature for the requested object, and comparing the new object signature with the object signature in the tag associated with the object.

9. An apparatus comprising:
an interface to receive a request to present a previously captured object to a user;
a storage medium having the object and a tag associated with the object stored thereon, the tag containing metadata related to the object, the metadata including an object signature; and
a processor to verify the authenticity of the object using the object signature in the tag associated with the object, wherein the captured object was intercepted by a capture system configured to intercept packets from data streams, reconstruct the data streams, and store network transmitted objects from the data streams according to a capture rule that defines which objects are to be captured by the capture system, wherein the tag is verified using a hash, which is decrypted with a public key of the capture system, and wherein the object is presented if the object and the tag are verified, and wherein the capture rule is part of a default rule set for the capture system configured to monitor network traffic and capture the object, and wherein the capture system is configured to store a document captured by the capture system according to the capture rule, which identifies a particular internet protocol (IP) address from which the document was sent, and wherein if the object is not verified, then an alert is generated to indicate that the object being presented to the user has been compromised.

10. The apparatus of claim 9, further comprising a display to present the object to the user.

11. The apparatus of claim 9, wherein the tag includes a tag signature, the tag signature being a cryptographically secure signature signed by a device that captured the object.

12. The apparatus of claim 11, wherein the tag signature is signed using a private key of a public key cryptosystem.

13. The apparatus of claim 11, wherein the processor is further to verify that the tag has not been altered since creation prior to presenting the object to the user.

14. The apparatus of claim 13, wherein the processor is further to alert the user that the tag has been altered in the event that the verification fails.

15. The apparatus of claim 9, wherein the processor is further to alert the user that the object has been altered in the event that the verification fails.

16. A method comprising:
    accessing a content store containing an object captured during transmission over a network;
    accessing a tag database containing a tag associated with the object, the tag including an object signature over the object and a tag signature over meta-data included in the tag, the meta-data including the object signature, the tag signature being cryptographically signed by a capture device; and
    verifying the authenticity of the tag and the object using the tag signature and the object signature, wherein the captured object was intercepted by a capture system configured to intercept packets from data streams, reconstruct the data streams, and store network transmitted objects from the data streams according to a capture rule that defines which objects are to be captured by the capture system, wherein the tag is verified using a hash, which is decrypted with a public key of the capture system, and wherein the object is presented if the object and the tag are verified, and wherein the capture rule is part of a default rule set for the capture system configured to monitor network traffic and capture the object, and wherein the capture system is configured to store a document captured by the capture system according to the capture rule, which identifies a particular internet protocol (IP) address from which the document was sent, and wherein if the object is not verified, then an alert is generated to indicate that the object being presented to the user has been compromised.

17. The method of claim 16, further comprising presenting the object to a user.

18. A machine-readable medium having stored thereon data representing instructions that, when executed by a processor, cause the processor to perform operations comprising:
    receiving a request to present a previously captured object to a user;
    accessing a tag associated with the requested object, the tag containing metadata related to the object, the metadata including an object signature;
    verifying that the object has not been altered since capture using the object signature in the tag associated with the object; and
    presenting the object to the user, wherein the captured object was intercepted by a capture system configured to intercept packets from data streams, reconstruct the data streams, and store network transmitted objects from the data streams according to a capture rule that defines which objects are to be captured by the capture system, wherein the tag is verified using a hash, which is decrypted with a public key of the capture system, and wherein the object is presented if the object and the tag are verified, and wherein the capture rule is part of a default rule set for the capture system configured to monitor network traffic and capture the object, and wherein the capture system is configured to store a document captured by the capture system according to the capture rule, which identifies a particular internet protocol (IP) address from which the document was sent, and wherein if the object is not verified, then an alert is generated to indicate that the object being presented to the user has been compromised.

19. The machine-readable medium of claim 18, wherein the tag includes a tag signature.

20. The machine-readable medium of claim 19, wherein the tag signature comprises a cryptographically secure signature.

21. The machine-readable medium of claim 20, wherein the tag signature is signed using a private key of a capture device that captured the object associated with the tag, the private key being part of a public key cryptosystem.

22. The machine-readable medium of claim 19, wherein the instructions further cause the processor to verify that the tag has not been altered since creation prior to presenting the object to the user.

23. The machine-readable medium of claim 22, wherein verifying that the tag has not been altered comprises alerting the user that the tag has been altered in the event that the verification fails.

24. The machine-readable medium of claim 18, wherein verifying that the object has not been altered comprises alerting the user that the object has been altered in the event that the verification fails.

25. A machine-readable medium having stored thereon data representing instructions that, when executed by a processor, cause the processor to perform operations comprising:
    accessing a content store containing an object captured during transmission over a network;
    accessing a tag database containing a tag associated with the object, the tag including an object signature over the object and a tag signature over meta-data included in the tag, the meta-data including the object signature, the tag signature being cryptographically signed by a capture device; and
    verifying the authenticity of the tag and the object using the tag signature and the object signature, wherein the captured object was intercepted by a capture system configured to intercept packets from data streams, reconstruct the data streams, and store network transmitted objects from the data streams according to a capture rule that defines which objects are to be captured by the capture system, wherein the tag is verified using a hash, which is decrypted with a public key of the capture system, and the object is presented if the object and the tag are verified, and wherein the capture rule is part of a default rule set for the capture system configured to monitor network traffic and capture the object, and wherein the capture system is configured to store a document captured by the capture system according to the capture rule, which identifies a particular internet protocol (IP) address from which the document was sent, and wherein if the object is not verified, then an alert is generated to indicate that the object being presented to the user has been compromised.

26. The machine-readable medium of claim 25, wherein the instructions further cause the processor to present the object to a user.

* * * * *